Jan. 22, 1952 — V. V. BOND — 2,583,355
HANDLE FOR FROZEN PRODUCTS
Filed Oct. 21, 1946
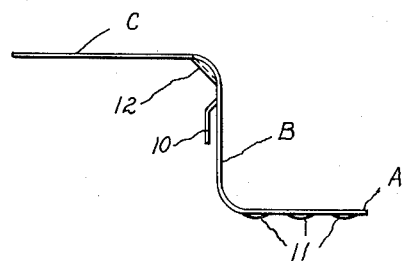
Fig. 1
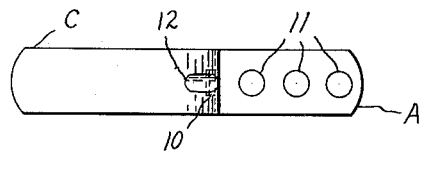
Fig. 2
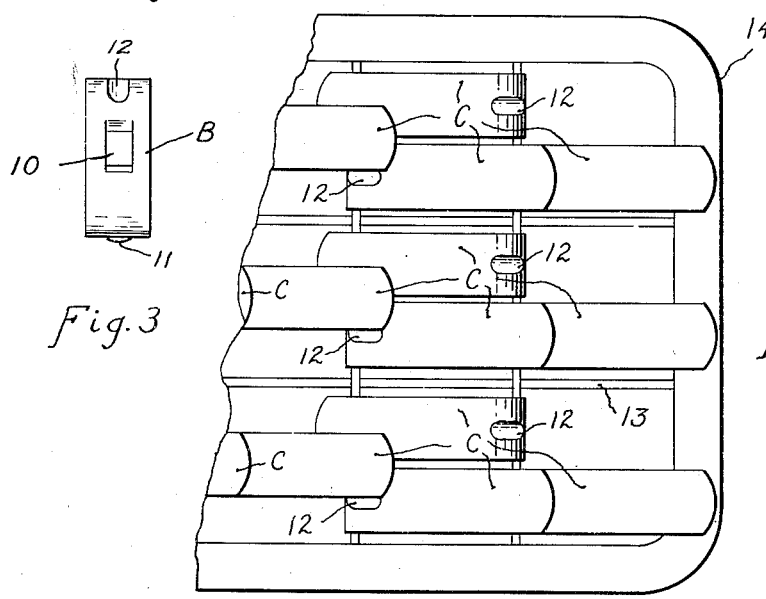
Fig. 3
Fig. 5
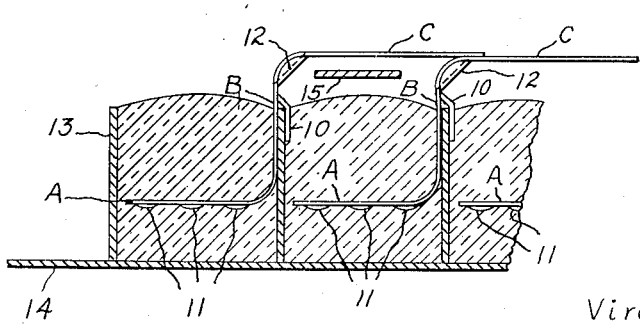
Fig. 4
INVENTOR.
Virgil V. Bond
BY
ATTORNEY Patented Jan. 22, 1952

2,583,355

UNITED STATES PATENT OFFICE 2,583,355

HANDLE FOR FROZEN PRODUCTS

Virgil V. Bond, Portland, Oreg., assignor to
R. V. Lewis, Portland, Oreg.

Application October 21, 1946, Serial No. 704,600

2 Claims. (Cl. 107—19)

This invention relates to a device for making frozen products. More particularly, it pertains to a handle for use in the production in a household mechanical refrigerator of frozen confections from diverse varieties of freezing mixtures.

The freezing trays of the ordinary household mechanical refrigerator obviously afford a convenient and economical means for freezing confections molded to the desired form by the retaining walls of the individual compartments of the tray, and having handles embedded in the confection. The handles may be placed in the individual compartments containing the unfrozen mixture, the mixture being thereafter frozen and thus firmly attached to the handles in blocks conforming to the shape of the compartments.

Many difficulties are, however, inherent in such a procedure. In the first place, it is necessary to provide the handles with means for firmly affixing them to the walls of the freezing compartments so that they remain in a desired position during the freezing process, but yet may conveniently be detached therefrom after the freezing process has been completed. It is further necessary that the handles be so designed that portions thereof will be suspended clear of the freezing mixture so as not to become submerged in said mixture as it expands upon freezing and, so as to be accessible to the blade of a knife or other instrument used for extracting them from the tray. It is also desirable that the handle be provided with means for firm attachment to the chunk of frozen confection so that said confection will not slide off while being eaten. It is still further desirable that the handle be of a strongly reinforced construction and that it be so designed as to be adapted for use with any of the types of freezing trays commonly in use in household mechanical refrigerators. It is also desirable to provide a handle which may simply and inexpensively be produced from available materials in a form which is sanitary and easy to clean.

It is the essence of the present invention that the foregoing features which are necessary and desirable to the successful freezing of confections in mechanical refrigerators are embodied in a handle of novel construction, which is fully described in the following detailed description and particularly pointed out in the appended claims, reference being had to the accompanying drawing, wherein:

Fig. 1 is a side elevation of one form of the handle which is the subject-matter of the invention.

Fig. 2 is a top plan view of said handle.

Fig. 3 is an end elevation of the handle.

Fig. 4 is a detail vertical longitudinal section of part of a freezing tray in which is positioned one form of said handle.

Fig. 5 is a top plan view (broken) of part of a freezing tray wherein are positioned a group of the handles of the invention, depicted as in actual use.

As illustrated in Figures 1 and 2, the novel handle of the invention comprises three sections, designated A, B and C, the terminal sections A and C being extended substantially opposite to each other and bent at about right angles to the intermediate section B. Attached to the intermediate section B is means for attaching the handle to the freezing compartment and comprising the hook or clip 10. The hook or clip is preferably in the shape of a tongue parallel to section B, and may conveniently be formed from and made integral with the substance of the handle by an appropriate punching operation.

Indicated at 11 and located on section A of the handle, which is designed to be immersed in the freezing mixture, are indentations or protuberances which, after the freezing process is complete, serve to affix firmly the frozen mass to the handle so as to prevent said mass from slipping off the handle while being eaten. These protuberances may be of varying number, depending, for example, upon the size of the freezing compartment, and may be fashioned in any suitable manner. In the average case, however, they are preferably three in number and are formed by simply pressing the material of which the handle is formed so as to form slight bulges or protuberances. It is to be noted that these protuberances, which may be located on either side or on both sides of section A of the handle serve a function not served by holes punched through the handle in corresponding positions, since it has been observed that in the latter case the mixture does not freeze through the holes to bind the frozen mass to the handle. On the contrary, voids or pockets are formed in the region of the holes so that there is not obtained the desired union between handle and frozen mixture.

On the handle, at the juncture between portions B and C, there is a reinforcing element, 12, to provide strength necessary to prevent bending or breaking under repeated use. This is of importance particularly since the section C of the handle is used to remove the frozen confection from the tray, and commonly is subjected to pressure with a knife blade or other implement in order to effect its removal. The reinforcing means may consist of a short longitudinal rib pressed out of the material of which the handle is constructed.

In use, as is illustrated in Figures 4 and 5, one or more of the handles are affixed by means of the clips 10 to the dividers 13 of the freezing tray 14, which is of any type in common use in household mechanical refrigerators. As so affixed, the section C is held free and clear of the freezing mixture, so as not to become embedded therein, but at the same time is in a position such as not to conflict with the roof or walls of the freezing chamber. Since the handle dips into the mixture and extends therefrom into the freezing environment, it serves the ancillary function of providing a heat radiating fin to accelerate the freezing process. It is also in a position such that, even though the compartment is filled substantially full, a suitable instrument may be slipped under the handle and used to extricate the frozen product from the mold.

After the freezing operation is complete, the tray is removed from the freezing compartment and subjected to a warm environment, preferably the prevailing atmospheric environment, until the frozen product has separated from the walls of the tray and may be removed by gravity or, preferably, by slipping a flat implement, as a knife blade, indicated at 15 of Fig. 4, beneath section C of the handle and lifting up to remove the cube with handle attached.

As the portion C is held in the hand, heat will tend to be conducted from the hand through portions C and B to portion A. Because of the fact that a considerable part of the cross section of the intermediate portion B is punched out to form the clip 10, the heat conductive path to the portion A is substantially reduced. Furthermore, heat from the hand will be dissipated to atmosphere through the clip element 10 which is connected at its upper end next adjacent the handle section C.

The handles of the invention may be fashioned from any suitable materials, it being preferred to use metals in sheet form. Sheet aluminum is a particularly desirable raw material, because of its heat conducting properties, because of the ease with which it lends itself to various construction procedures, because of its strength, and because of the ease with which objects fabricated from aluminum can be kept clean and sanitary. When made from sheet aluminum or similar material, the handles conveniently can be produced in a single operation by punching and pressing with suitable dies.

Having described my invention and in what manner the same may be practised, what I claim as new and desire to protect by Letters Patent is:

1. A handle for frozen confections consisting of a first terminal section adapted to lie within a compartment of a freezing tray, a second terminal section adapted to extend over and above the freezing mixture contained in said freezing tray, an intermediate section connecting said first terminal section and said second terminal section and adapted to extend downwardly along a wall of said compartment, means on said first terminal section for achieving a firm union between the same and the frozen product, and a clip integral with said intermediate section for attachment of said handle to said wall, said clip extending longitudinally of the surface of said intermediate section facing toward said second terminal section and being directed away from said second terminal section so as to be capable of engaging the outer surface of said wall, the point of attachment of said clip to said intermediate section being close to the junction of said first terminal section with said intermediate section whereby said clip functions to hold said first terminal section above the bottom of the compartment of a freezing tray of normal depth.

2. A metallic handle adapted to be inserted into the compartment of a freezing tray during the manufacture therein of frozen products, which comprises a first terminal section adapted to lie within said compartment, protuberances on said first section for firmly securing a frozen product thereto, a second terminal section adapted to lie over and above said tray in a position substantially parallel to said first section, an intermediate section connecting said first section and said second section and adapted to extend downwardly along a wall of said compartment, said terminal sections extending in opposite directions from said intermediate section, a tongue integral with said intermediate section and extending longitudinally thereof, said tongue being struck from the material of said handle and attached thereto adjacent the joint between said second terminal section and said intermediate section, said tongue being struck out from the side of said intermediate section facing toward said second terminal section with the point of attachment thereof to the intermediate section being near the junction of said intermediate section with said second terminal section and the free end thereof being directed toward the junction of said first terminal section with said intermediate section, and means for reinforcing the joint between said second terminal section and said intermediate section.

VIRGIL V. BOND.

REFERENCES CITED

The following references are of record in the file of this patent:

UNITED STATES PATENTS

| Number | Name | Date |
| --- | --- | --- |
| 2,074,500 | York | Mar. 23, 1937 |
| 2,151,282 | Stamp | Mar. 21, 1939 |
| 2,209,697 | Kislingbury et al. | July 30, 1940 |